United States Patent
Gehringhoff et al.

(10) Patent No.: US 8,202,376 B2
(45) Date of Patent: Jun. 19, 2012

(54) HIGH-STRENGTH MOTOR-VEHICLE FRAME PART WITH TARGETED CRASH

(75) Inventors: Ludger Gehringhoff, Paderborn (DE); Dirk Kröger, Licthenau (DE); Elisabeth Danger, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 1385 days.

(21) Appl. No.: 11/599,604

(22) Filed: Nov. 14, 2006

(65) Prior Publication Data

US 2007/0107819 A1 May 17, 2007

(30) Foreign Application Priority Data

Nov. 15, 2005 (DE) .......................... 10 2005 054 847

(51) Int. Cl.
*C21D 8/00* (2006.01)
(52) U.S. Cl. .................. 148/643; 148/639; 148/648
(58) Field of Classification Search ............ 148/95, 148/559, 566–576, 579–604, 622–624, 639–644, 148/648–654
See application file for complete search history.

(56) References Cited

U.S. PATENT DOCUMENTS

| | | | |
|---|---|---|---|
| 5,972,134 A | 10/1999 | Buschsiewecke et al. | |
| 6,524,404 B2 | 2/2003 | Gehringhoff et al. | |
| 6,758,921 B1 | 7/2004 | Streubel et al. | |
| 2005/0109433 A1 | 5/2005 | Danger et al. | |
| 2005/0140179 A1* | 6/2005 | Morsch et al. | 296/204 |

FOREIGN PATENT DOCUMENTS

| | | |
|---|---|---|
| EP | 0 753 595 | 1/1997 |
| GB | 1 490 535 | 11/1997 |

* cited by examiner

*Primary Examiner* — Scott Kastler
*Assistant Examiner* — Vanessa Luk
(74) *Attorney, Agent, or Firm* — Andrew Wilford

(57) ABSTRACT

A structural motor-vehicle element is made by hot-shaping and press-hardening a steel workpiece into the element and thereafter heating the hot-shaped and press-hardened workpiece to between 320° C. and 400° C. The steel workpiece constitutes in weight percent,

| | |
|---|---|
| Carbon (C) | 0.18% to 0.3% |
| Silicon (Si) | 0.1% to 0.7% |
| Manganese (Mn) | 1.0% to 2.5% |
| Phosphorus (P) | max. 0.025% |
| Chromium (Cr) | up to 0.8% |
| Molybdenum (Mo) | up to 0.5% |
| Sulfur (S) | max. 0.01% |
| Titanium (Ti) | 0.02% to 0.05% |
| Boron (B) | 0.002% to 0.005% |
| Aluminum (Al) | 0.01% to 0.06% | the rest iron including impurities caused by the smelting process.

4 Claims, 2 Drawing Sheets

HIGH-STRENGTH MOTOR-VEHICLE FRAME PART WITH TARGETED CRASH

FIELD OF THE INVENTION

The present invention relates to a motor-vehicle structural element. More particularly this invention concerns such a structural element made of hot-shaped high-strength steel that is intended for use as a frame element and that has a specific targeted deformation.

BACKGROUND OF THE INVENTION

In order to minimize weight and to meet stringent safety requirements, in motor-vehicle construction it is standard to make more and more of the vehicle frame parts or elements of and high-tensile-strength steel. Such elements, in unibody construction, include side impact beams, A- and B-columns, bumpers, side rails, and cross rails, that are increasingly being made from a hot-shaped and pressure-hardened or high-strength steel.

GB 1,490,535 of describes a method for pressure-forming and hardening a relatively thin steel sheet having good dimensional stability in which a sheet made of boron-alloyed steel is heated to above the $AC_3$ temperature and then in less than 5 seconds is pressed into the final shape between two indirectly cooled tools with a significant change in shape. After the hot-shaping the workpiece stays in the press for to rapid cooling such that a martensitic and/or bainitic structure is obtained. This way, a product is obtained that has high shape accuracy, good dimensional stability, and high strength, and that is highly suitable for structural and safety elements in motor-vehicle manufacture. This process is referred to in the following as heat-forming and pressure-hardening.

US 2005/0199433 based on application Ser. No. 10/962,982 of Danger describes the hot-shaping and pressure-hardening of a type of steel having substantially the following composition in weight percent:

| | |
|---|---|
| carbon | 0.18 to 0.3% |
| silicon | 0.1 to 0.7% |
| manganese | 1.0 to 2.5% |
| phosphorus | max. 0.025% |
| chromium | up to 0.8% |
| molybdenum | up to 0.5% |
| sulfur | max. 0.01% |
| titanium | 0.02 to 0.05% |
| boron | 0.0015 to 0.005% |
| aluminum | 0.01 to 0.06% | balance iron and usual smelting-related impurities. After hot-shaping and hardening, this steel has a yield point $R_{p0.2} \geq 950$ N/mm$^2$, tensile strength $R_m \geq 1350$ N/mm$^2$, and elongation $A_5 \geq 8\%$. This product is marketed under the trade name BTR 165. A hot-shaped and hardened structural and/or safety component made of BTR 165 is then clamped in a heat chamber and coated on all sides with a sherardizing powder made of zinc at less than 320° C. The hot-shaped and pressure-hardened structural and/or safety component must be heated as little as possible during the solid diffusion process so that the strength of the hardened steel is not significantly affected. Thus the piece is subsequently worked at temperatures below 320° C.

U.S. Pat. No. 6,758,921 describes is a method for producing a bending-resistant torsionally yielding tube for use as a transverse support for a torsion-bar rear axle in which a tube made of tempered steel is first made by U-shaped cold forming with a torsionally yielding central longitudinal section while ensuring torsion-proof end sections, the thus formed tubular profile subsequently being annealed at least in partial sections at a temperature between 920° C. and 960° C., subsequently hardened in water at above the $AC_3$ point, subsequently tempered at a temperature between 240° C. and 320° C. over a period of about 20 minutes, then subjected to at least one outer surface hardening, and finally subjected to further shaping process to make a torsion-bar rear axle.

U.S. Pat. No. 5,972,134 of Buschsieweke describes homogeneously heating a workpiece of BTR 165 initially to a temperature between 900° C. and 950° C., then shaping the workpiece into a shaped part in a press, and then tempering the shaped part in the press in order subsequently to bring some areas of the shaped part to a temperature between 600° C. and 900° C. in less than 30 seconds. Areas with higher ductility are created in the workpiece in this manner. At temperatures between 600° C. and 900° C. there is a major structural change in the steel, which means that the mechanical values change to those of unhardened steel. Therefore the steel no longer has high tensile strength in the ductile areas.

Structural and safety elements are for instance side impact beams, bumpers, B-columns, and side rails. A partially hardened B-column made of BTR 165 is disclosed for instance in U.S. Pat. No. 6,524,404 of Gehringhoff. As a rule, B-columns, bumpers, and side impact beams are loaded to bending in a collision. This is not the case for instance for a side rail. Side rails run in the vehicle's longitudinal direction and are also produced from high-strength steel. If the vehicle is struck from the front or rear, crash energy is conducted into the side rail in the longitudinal direction. The side rail should have high tensile strength, but starting with a defined load should convert crash energy to deformation by crumpling. However, the described BTR 165 material when hardened for instance is not ductile enough to crumple. As a rule, the hardened material does not deform when loaded so that at times there can be brittle element ruptures. This is disadvantageous for decreasing the energy.

Finally, EP 0,753,595 of Bergs describes tubes for making stiffeners or stabilizers that prevent frame deformation. They are made of a specific boron-alloyed steel but still have some failings in that giving them a targeted deformation response is very difficult.

OBJECTS OF THE INVENTION

It is therefore an object of the present invention to provide an improved motor-vehicle structural element.

Another object is the provision of such an improved motor-vehicle structural element that overcomes the above-given disadvantages, in particular a hot-shaped and pressure-hardened structural and/or safety element for a motor vehicle made of high tensile steel that has targeted crumpling in a collision, even while having high-strength mechanical properties.

SUMMARY OF THE INVENTION

A method of making a structural motor-vehicle element, has according to the invention the steps of hot-shaping and press-hardening a workpiece into the element; and thereafter heating the hot-shaped and press-hardened workpiece to between 320° C. and 400° C.

The heat treatment according to the invention specifically influences the high-strength properties of the element. The yield point $R_{p0.2}$ and elongation $A_5$ remain nearly unchanged.

Only the tensile strength values Rm are reduced by 100 to 200 N/mm². In the case of BTR 165 steel that constitutes in weight percent,

| | |
|---|---|
| Carbon (C) | 0.18% to 0.3% |
| Silicon (Si) | 0.1% to 0.7% |
| Manganese (Mn) | 1.0% to 2.5% |
| Phosphorus (P) | max. 0.025% |
| Chromium (Cr) | up to 0.8% |
| Molybdenum (Mo) | up to 0.5% |
| Sulfur (S) | max. 0.01% |
| Titanium (Ti) | 0.02% to 0.05% |
| Boron (B) | 0.002% to 0.005% |
| Aluminum (Al) | 0.01% to 0.06% | the rest iron including impurities caused by the smelting process. After the heat treatment at 320 to 400° C. the tensile strength Rm is 1200 to 1400 N/mm², the yield point $R_{p0.2}$ is 950 to 1250 N/mm², and the stretch or elongation $A_5$ is 6-12%. The material still has the necessary high-strength mechanical properties, but, due to the somewhat lower tensile strength Rm, it has enough ductility that it crumples instead of breaking or rupturing in a collision.

Surprisingly, the slight reduction in strength is enough to restore the deformability in a structural and/or safety element in the context of crumpling, despite high-strength properties. As a rule, crumpling is possible with an axial load on a structural or safety element. With axial or longitudinal loading a certain deformation path must be available for a very intentional deformation. This is for instance the case with side rails or floor crossbeams. In contrast, a B-column must not penetrate into the passenger compartment. Therefore it does not make sense to use the invention for B-columns.

In one special embodiment the invented element is coated. In addition to the corrosion protection that is required in many cases, it is inventively possible to provide the heat treatment for the element simultaneously in conjunction with a coating method at 320 to 400° C. This is possible for instance with a dip-coating or diffusion method. Depending on the load for which the element is designed, it can make sense to provide heat treatment of only part of the element at 320 to 400° C. Thus an area without deformation can be created in addition to an area with potential crumpling but very high strength.

One application for an inventively produced element is a front or rear vehicle side rail, and another application is comprised for instance in rocker-panel reinforcement in the vehicle frame. In addition, all high-strength structural and safety elements are suitable in which there is an adequate deformation path for the desired deformation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
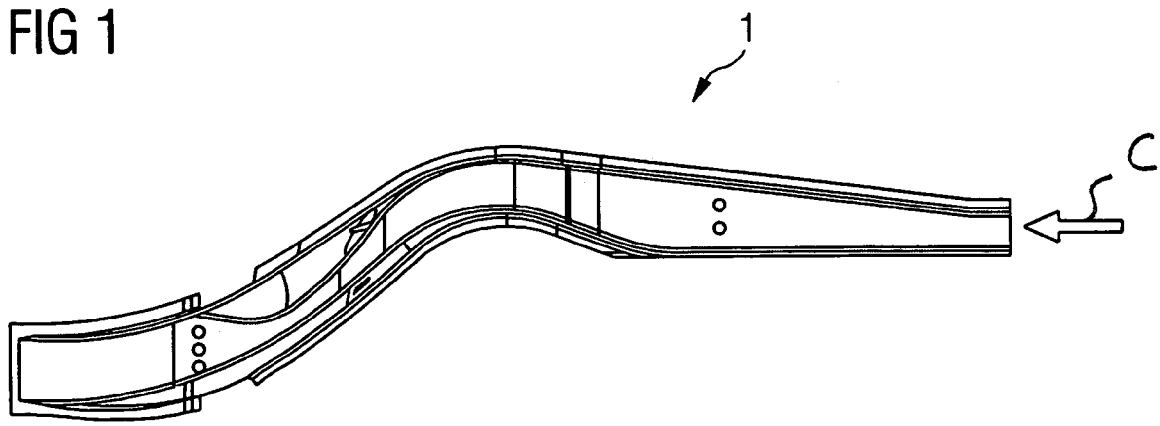
FIG. 1 shows a side rail in its normal condition.

As seen in FIG. 1 shows a rear side rail 1 according to the invention prior to a collision, in which a basically longitudinal force is applied to its end as shown by arrow C. The side rail 1 has been hot-shaped and pressure-hardened along its entire length. In a collision, it is supposed to crumple. The side rail 1 has intentionally been heat-treated at 320 to 400° C. to attain this effect.

Figure 2:
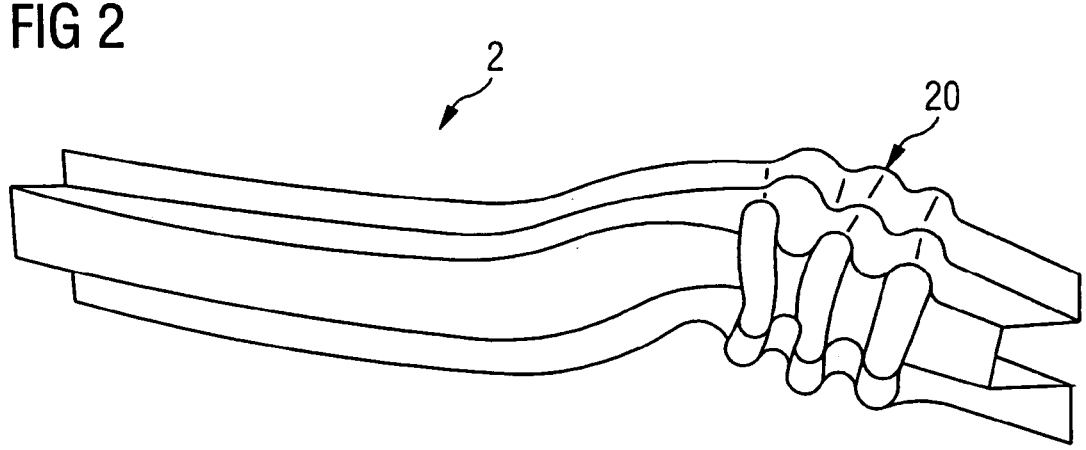
FIG. 2 shows the rail after collision-induced crumpling.

FIG. 2 shows a inventive side rail 2 after a crash. The side rail 2 deforms in that it creates crumple-like folds 20. Crash energy is converted to deformation as these folds 20 are formed. However, due to the high strength values, such a deformation does not occur until considerable force has been applied to the element, as a rule in such a case the vehicle body is deformed in an economically irreparable manner, that is the vehicle is "totaled." However, the formation of folds 20 serves to protect the occupants so that crash energy is converted to work and does not impact the occupants in its entirety. In an inventive side rail 2 made of BTR 165, even after a heat treatment at 320 to 400° C. after the hardening there is still tensile strength Rm of 1200 to 1400 N/mm², a yield point $Rp_{0.2}$ of 950 to 1250 N/mm², and an elongation $A_5$ of 6 to 12%. Thus the inventive side rail 2 is still high-strength but ductile enough to crumple, instead of just rupturing, when there are high crash forces.

Figure 3:
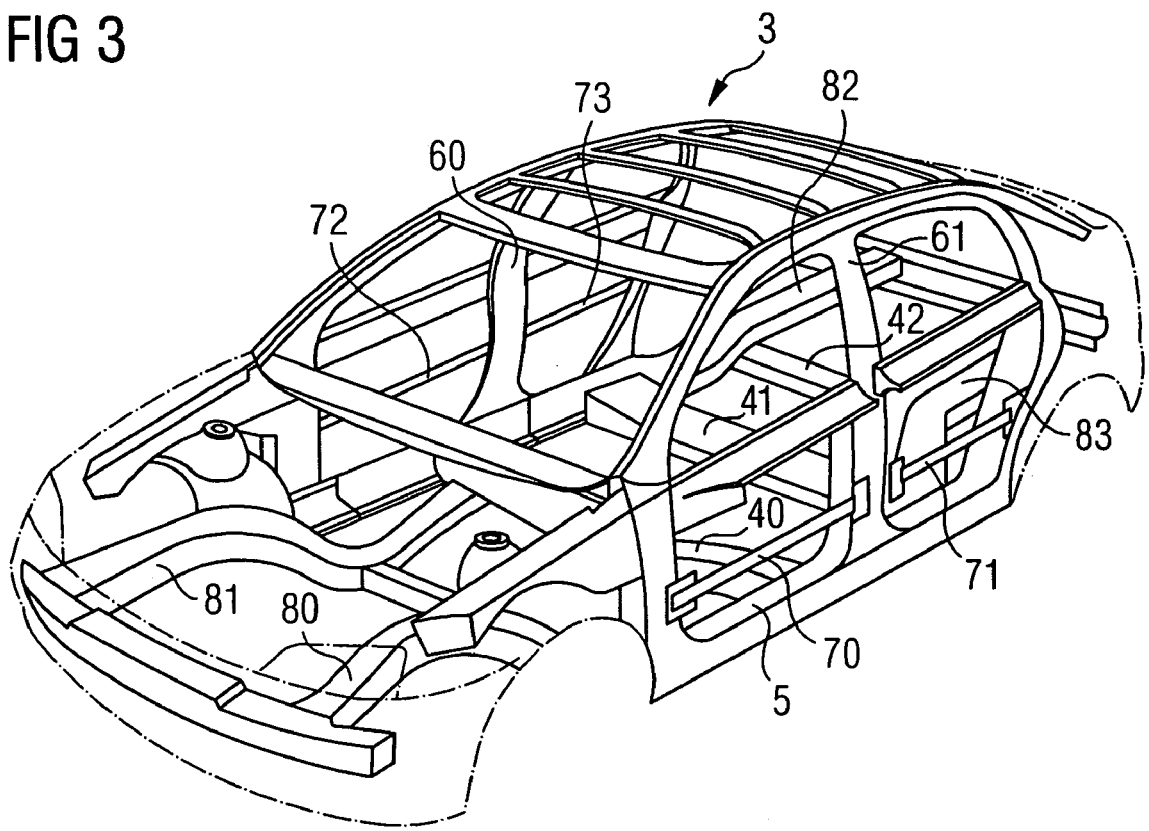
FIG. 3 shows the structural elements or unibody frame of a motor vehicle incorporating the element according to the invention.

FIG. 3 shows a vehicle body 3 with its structural and safety elements. The rear and front side rails 80, 81, 82, and 83 are made according to the instant invention. As a rule, the floor crossbeams 40, 41, and 42 that extend transversely of the longitudinal beams or rails 80-83 are also axially loaded in a collision, and the same is true for the rocker panel reinforcement 5. In contrast, the B-columns 60 and 61 and the side impact beams 70, 71, 72, and 73 must not, to the greatest extent possible, deform into the passenger compartment.

Figure 4:
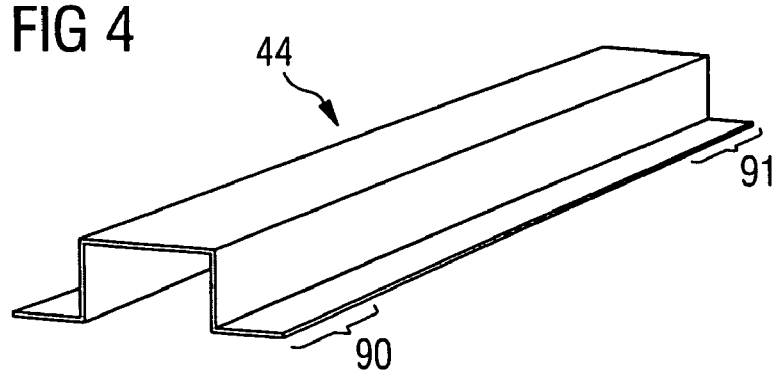
FIG. 4 shows a floor crossbeam.

FIG. 4 is a schematic representation of a floor crossbeam 44 that has according to the invention been partially heat-treated at 320° C. to 400° C. across about ⅙ of its length in each of the end areas 90 and 91. This creates a maximum deformation path of ⅔ of the entire length of the floor crossbeam 44 despite high tensile mechanical properties. The rest of the length, that is about ⅘ of the floor crossbeam 44, remains unchanged after the hot-shaping and pressure-hardening. It guarantees a stable passenger cell.

We claim:

1. A method of making a motor-vehicle floor beam, the method comprising the steps of:
   hot-shaping and press-hardening a workpiece into the floor beam; and thereafter
   heating only portions of the hot-shaped and press-hardened workpiece to between 320° C. and 400° C.

2. The method defined in claim 1, further comprising the step of
   applying a corrosion-protective layer to the workpiece.

3. The method defined in claim 1 wherein the element beam has substantially the following composition in weight percent:

| | |
|---|---|
| carbon | 0.18 to 0.3% |
| silicon | 0.1 to 0.7% |
| manganese | 1.0 to 2.5% |
| phosphorus | max. 0.025% |
| chromium | up to 0.8% |
| molybdenum | up to 0.5% |
| sulfur | max. 0.01% |
| titanium | 0.02 to 0.05% |
| boron | 0.002 to 0.005% |
| aluminum | 0.01 to 0.06% | balance iron and usual smelting-related impurities, the workpiece having after heating to 320° C. to 400° C. a strength Rm of 1200 N/mm² to 1400 N/mm², a yield point $R_{p0.2}$ of 950 N/mm² to 1250 N/mm², and a stretch $A_5$ of 6% to 12%.

4. The method defined in claim 3 wherein the beam is a longitudinal floor beam.

* * * * *